(12) United States Patent
Nishimura et al.

(10) Patent No.: US 12,404,944 B2
(45) Date of Patent: Sep. 2, 2025

(54) COVER MEMBER AND THERMOSTAT DEVICE EQUIPPED WITH COVER MEMBER

(71) Applicant: NIPPON THERMOSTAT CO., LTD., Kiyose (JP)

(72) Inventors: Tetsuya Nishimura, Kiyose (JP); Syota Morizumi, Kiyose (JP); Masayuki Numata, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 18/567,572

(22) PCT Filed: Mar. 31, 2022

(86) PCT No.: PCT/JP2022/016523
§ 371 (c)(1),
(2) Date: Dec. 6, 2023

(87) PCT Pub. No.: WO2022/264651
PCT Pub. Date: Dec. 22, 2022

(65) Prior Publication Data
US 2024/0271714 A1    Aug. 15, 2024

(30) Foreign Application Priority Data
Jun. 15, 2021    (JP) .................................. 2021-099122

(51) Int. Cl.
*F16K 27/12*    (2006.01)
*F01P 7/16*    (2006.01)

(52) U.S. Cl.
CPC ................ *F16K 27/12* (2013.01); *F01P 7/16* (2013.01)

(58) Field of Classification Search
CPC . F16K 27/12; F16K 31/001; F01P 7/16; F16J 15/10
See application file for complete search history.

(56) References Cited

U.S. PATENT DOCUMENTS

2013/0180477 A1    7/2013 Nakajima et al.
2017/0074155 A1*   3/2017 Shimomura ............ F01P 7/165
(Continued)

FOREIGN PATENT DOCUMENTS

CN    100419320 C  *  9/2008  ........... F16K 31/002
CN    102759232 A  *  10/2012
(Continued)

OTHER PUBLICATIONS

Machine Translation of KR20180031999A PDF File Name: "KR20180031999A_Machine_Translation.pdf" (Year: 2018).*
(Continued)

*Primary Examiner* — Lindsay M Low
*Assistant Examiner* — Ruben Picon-Feliciano
(74) *Attorney, Agent, or Firm* — HAUPTMAN HAM, LLP (57) ABSTRACT

To prevent a gasket fitted into a groove of a housing of a thermostat device from coming off and the leakage of coolant. A cover member detachably attached to a thermostat device includes a housing that has a body having an opening at one end and a groove surrounding the opening and a pair of legs standing inside the groove from one end of the body, and a gasket to be fitted into the groove. The cover member has a dish-shaped portion that has an insertion hole through which the pair of legs is inserted and covers the gasket, and a cylindrical portion erecting from the opening edge of the insertion hole and into which the pair of (Continued)

legs are press-fitted inside, and a corrugated section is formed in the portion of the cylindrical portion opposite to the legs.

9 Claims, 7 Drawing Sheets

(56) References Cited

U.S. PATENT DOCUMENTS

| | | | |
|---|---|---|---|
| 2018/0179944 A1* | 6/2018 | Endo | F01P 7/16 |
| 2022/0154627 A1 | 5/2022 | Nishimura | |

FOREIGN PATENT DOCUMENTS

| | | | | |
|---|---|---|---|---|
| EP | 1602809 A1 | | 12/2005 | |
| JP | 3310547 B2 | | 8/2002 | |
| JP | 2004-270645 A | | 9/2004 | |
| JP | 2020-169611 A | | 10/2020 | |
| KR | 20180031999 A | * | 3/2018 | ............... F01P 7/16 |
| WO | WO-2010122832 A1 | * | 10/2010 | ........... G05D 23/022 |
| WO | WO-2012063547 A1 | * | 5/2012 | ............... F01P 7/16 |
| WO | 2012/087252 A1 | | 6/2012 | |

OTHER PUBLICATIONS

Machine Translation of WO 2012063547 A1 PDF File Name: "WO2012063547A1_Machine_Translation.pdf" (Year: 2012).*
Machine Translation of CN 102759232 A PDF File Name: "CN102759232A_Machine_Translation.pdf" (Year: 2012).*
Machine Translation of CN 100419320 C PDF File Name: "CN100419320C_Machine_Translation.pdf" (Year: 2008).*
Machine Translation of WO 2010122832 A1 PDF File Name: "WO2010122832A1_Machine_Translation.pdf" (Year: 2010).*
PCT/ISA/210, "International Search Report for PCT International Application No. PCT/JP2022/016523," Jun. 21, 2022.

* cited by examiner

COVER MEMBER AND THERMOSTAT DEVICE EQUIPPED WITH COVER MEMBER

RELATED APPLICATIONS

The present application is National Phase of International Application No. PCT/JP2022/016523 filed Mar. 31, 2022, and claims priority from Japanese Application No. 2021-099122, filed Jun. 15, 2021, the disclosure of which is hereby incorporated by reference herein in its entirety.

TECHNICAL FIELD

This invention relates to a cover member of a gasket attachable to a thermostat device and a thermostat device with the cover member.

BACKGROUND ART

A thermostat device is equipped in a cooling circuit of an engine (an internal combustion engine) and adjusts the temperature of the coolant. The housing of the thermostat device has an opening on one end, and the edge of the opening contacts closely to a counterpart member (a water pump and a water jacket of the engine, for example) through a gasket as a sealing member. This prevents the leakage of the coolant in the housing.

More specifically, an annular groove surrounding the opening is formed at the opening end of the housing (Patent Literature 1, for example), and an annular gasket is fitted to the groove (Patent Literature 2, for example).

CITATION LIST

Patent Literature

PTL 1: JP-A-2020-169611
PTL 2: Japanese Patent No. 3310547

SUMMARY OF INVENTION

Technical Problem

The gasket recited in PTL 2 has projecting parts on the inner and outer circumferences to prevent it from coming off. This prevents the gasket from coming off the groove due to vibration when transporting the thermostat device to the counterpart member before assembly. However, to keep the gland fill of the gasket to an appropriate value, the number of projecting parts to prevent the coming-off cannot be increased without limits; the provision of coming-off-preventing projecting parts alone may not be sufficient to reliably prevent the gasket from coming off the groove.

The present invention is made in considering the above problem. It aims to provide a cover member that reliably prevents the gasket from coming off and a thermostat device with the cover member.

Solution to Problem

As for a first means to solve the above problem, a cover member according to the present invention is the one that is detachably attached to the thermostat device. The thermostat device is provided with a housing that includes a body having an opening at one end and a groove formed to surround the opening and a pair of legs standing up opposingly from one end of the body inside the groove, and also with a gasket to be fitted into the groove. The cover member is provided with a dish-shaped portion covering the gasket having insertion holes inside in which the pair of legs are inserted and a cylindrical portion standing up from the opening edge of the insertion holes, inside of which the pair of legs are press-fitted, and a corrugated section is formed at a portion opposing to the legs of the cylindrical portion.

With this, in a state where the cover member is attached to the thermostat device, since the gasket is covered with the dish-shaped portion, the gasket will not come off.

As for a second means to solve the above problem, a thermostat device, according to the present invention, with a cover member is provided with a thermostat device and a cover member to be detachably attached to the thermostat device.

The thermostat device includes a housing being provided with a body that has an opening at one end and a groove formed so as to surround the opening and a pair of legs standing up opposing to each other at the one end of the body inside the groove, and a gasket to be fitted in the groove. The cover member additionally includes a dish-shaped portion that has insertion holes inside, through which the pair of legs are to be inserted, and covers the gasket, and a cylindrical portion standing up from the opening edge of the insertion holes and to which the pair of legs is to be press-fitted thereinside, and a corrugated section is formed at the portion of the cylindrical portion opposing to the legs.

With this, in a state where the cover member is attached to the thermostat device, since the gasket is covered with the dish-shaped portion, the gasket will not come off.

Further, the thermostat device includes a valve seat formed inside the body, a thermo-element, one end of which is supported by the body, extending and retracting depending on the temperature, a valve body unseated from or seated on the valve seat in response to the extension-retraction operation of the thermo-element, a biasing member biasing the valve body to the valve seat side, and a frame being supported by the pair of legs to support one end of the biasing member. An inward-convex portion protruding inward is formed inside the cylindrical portion of the cover member; the inward-convex portion is located at the body side from the frame in a state where the cover is attached to the thermostat device. When the cover member is attached to or detached from the thermostat device, the inward-convex portion may be made in contact with the frame to deform elastically.

This allows to prevent the cover member from coming off from the thermostat device unintentionally due to vibration during transportation.

Further, as for a third means to solve the above problem, the cover member, according to the present invention, is a cover detachably attached to the thermostat device. The thermostat device includes a housing being provided with a body that has an opening at one end and a groove formed so as to surround the opening and a pair of legs standing up opposing to each other at the one end of the body inside the groove, a gasket to be fitted in the groove, a valve seat formed inside the body, a thermo-element, one end of which is supported by the body, extending and retracting depending on the temperature, a valve body unseated from or seated on the valve seat in response to the extension-retraction operation of the thermo-element, a biasing member biasing the valve body to the valve seat side, and a frame being supported by the pair of legs to support one end of the biasing member. The cover member includes a dish-shaped portion that has insertion holes inside, through which the pair of legs are to be inserted, and covers the gasket, and a cylindrical portion standing up from the opening edge of the insertion holes and to which the pair of legs is to be inserted thereinside.

An inward-convex portion protruding inward is formed on the cylindrical portion. The inward-convex portion is located at the body side from the frame in a state where the cover is attached to the thermostat device. When the cover member is attached to or detached from the thermostat device, the inward-convex portion comes into contact with the frame to deform elastically.

With this, in a state where the cover member is attached to the thermostat device, since the gasket is covered with the dish-shaped portion, the gasket will not come off.

Further, as for a fourth means to solve the above problem, in the thermostat device with a cover member according to the present invention, the thermostat device includes a valve seat formed inside the body, a thermo-element, one end of which is supported by the body, extending and retracting depending on the temperature, a valve body unseated from or seated on the valve seat in response to the extension-retraction operation of the thermo-element, a biasing member biasing the valve body to the valve seat side, and a frame being supported by the pair of legs to support one end of the biasing member. An inward-convex portion protruding inward is formed on the cylindrical portion. The inward-convex portion is located at the body side from the frame in a state where the cover is attached to the thermostat device. When the cover member is attached to or detached from the thermostat device, the inward-convex portion comes into contact with the frame to deform elastically.

With this, in a state where the cover member is attached to the thermostat device, since the gasket is covered with the dish-shaped portion, the gasket will not come off.

For the cover member, one end of the cylindrical member may be closed; this prevents dust from entering the inside of the cover member, for example.

For the cover member, the surface shape of the inward-convex portion may be spherical. With this, the cover member becomes easy to attach to the thermostat device. Then, the hooking margin of the inward-convex portion to the frame can be easily ensured, and the coming off of the cover member from the thermostat device due to the vibration during transportation can surely be suppressed.

For the cover member, portions of the cylindrical portion located at the outside of the inward-convex portion may be recessed. This allows the inward-convex portion to elastically deform easily and enables the cover member to be mounted to the thermostat device. Then, the hooking margin of the inward-convex portion to the frame can be easily ensured, and the coming off of the cover member from the thermostat device due to the vibration during transportation can be further suppressed.

Protrusions protruding outward of the dish-shaped portion may be formed on the gasket in the thermostat device to which the cover member is to be attached. With this, the gasket being attached can be visually confirmed easily, even in the case of the thermostat device with the cover member.

Advantageous Effects of the Invention

With the cover member and the thermostat device with the cover member according to the present invention, the coming off of the gasket can be surely inhibited in the state where the cover member is attached to the thermostat device.

DESCRIPTION OF EMBODIMENTS

A cover member and a thermostat device with the cover member according to an embodiment of the present invention will be described based on the drawings below.

Figure 1:
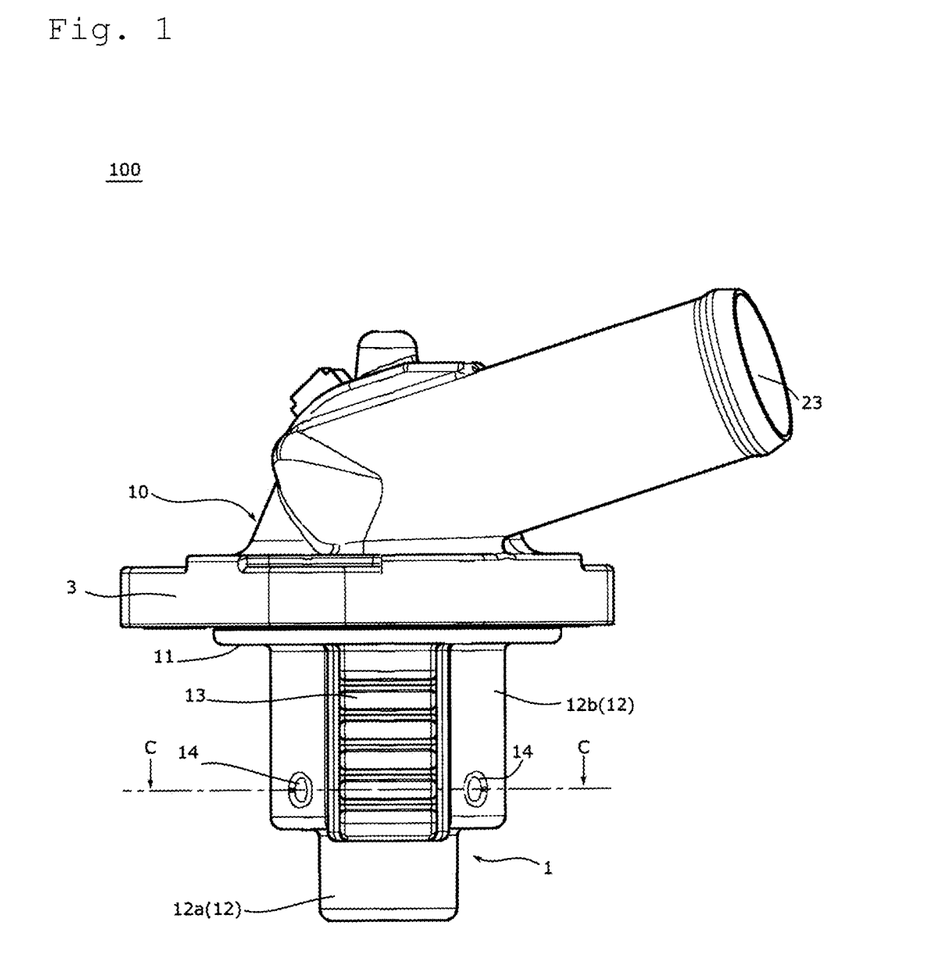
FIG. 1 is a side view of a thermostat device with the cover member of an embodiment to which a cover member is attached.
Figure 2:
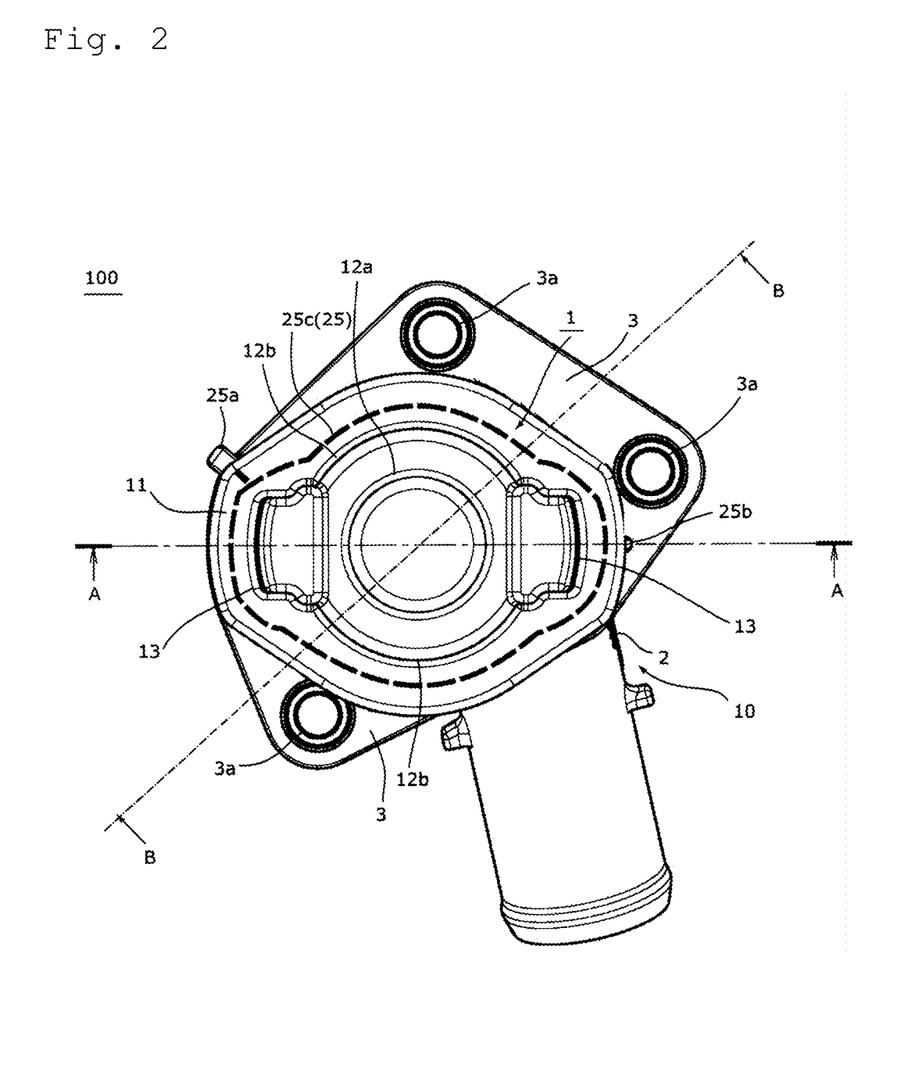
FIG. 2 is a bottom view of the thermostat device with the cover member of FIG. 1.
Figure 3:
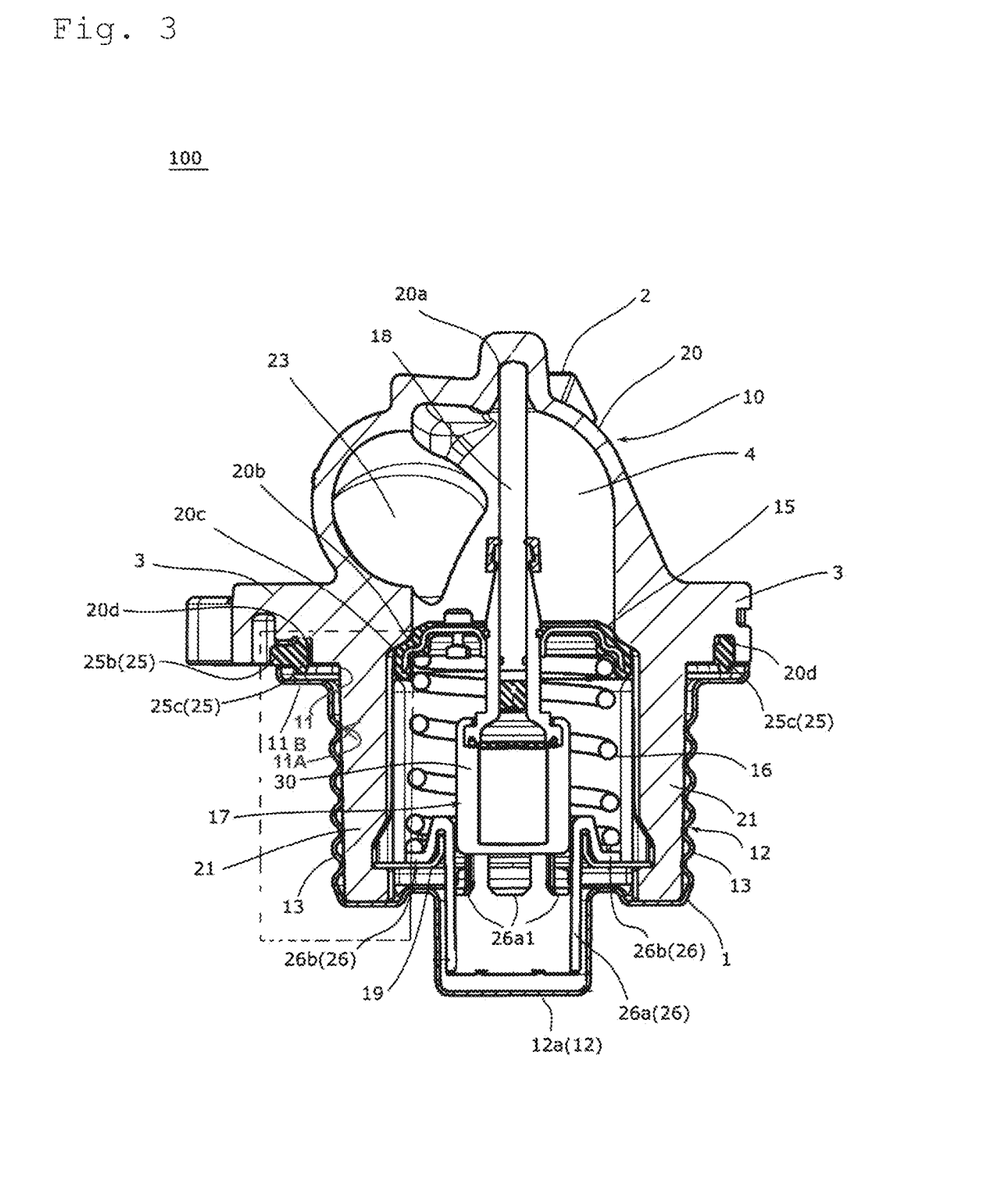
FIG. 3 is a cross-sectional view on arrow A-A of the thermostat device with the cover member of FIG. 2.
Figure 4:
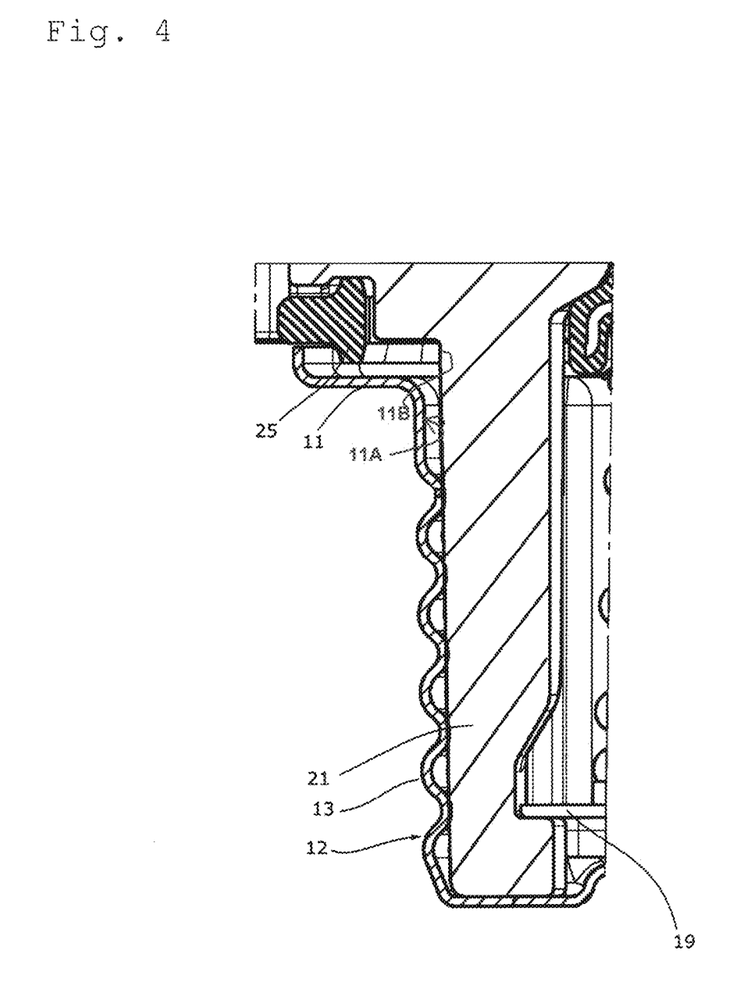
FIG. 4 is an enlarged cross-sectional view of part of the thermostat device in FIG. 3.
Figure 5:
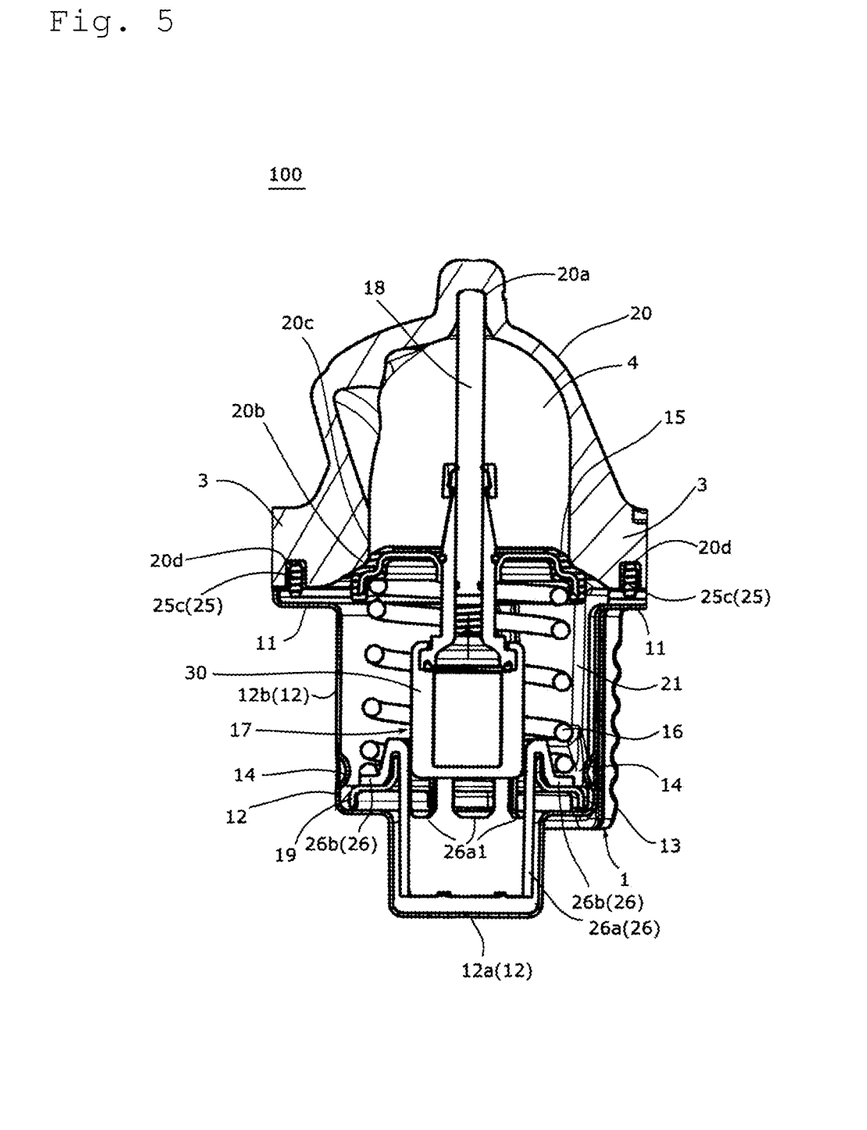
FIG. 5 is a cross-sectional view on arrow B-B of the thermostat device with the cover member of FIG. 2.
Figure 6:
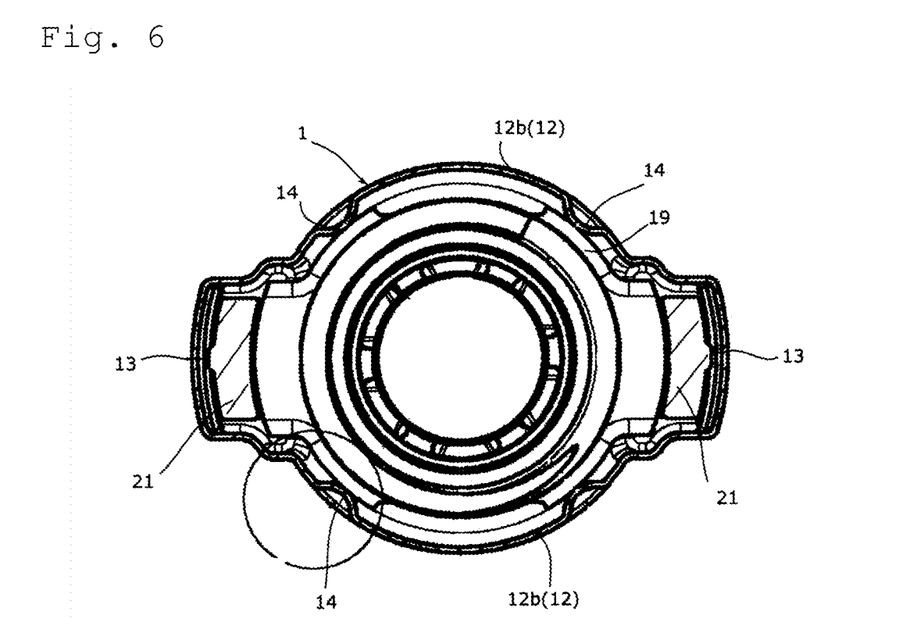
FIG. 6 is a cross-sectional view on arrow C-C of the thermostat device with the cover member of FIG. 1.
Figure 7:
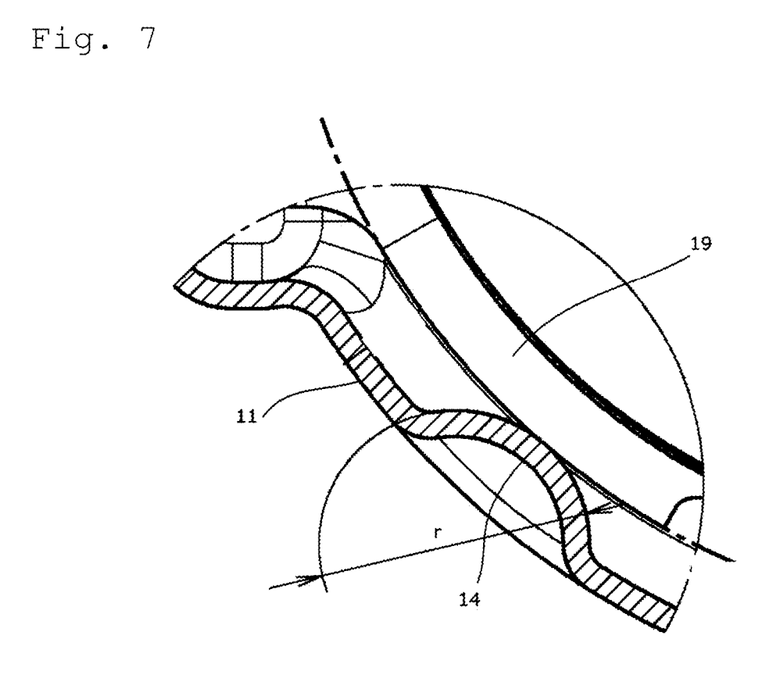
FIG. 7 is a cross-sectional view illustrating an enlarged part of FIG. 6.

FIG. 1 is a side view of a thermostat device with the cover member of an embodiment to which a cover member is attached, and FIG. 2 is a bottom view of the thermostat device with the cover member of FIG. 1. FIG. 3 is a cross-sectional view on arrow A-A of the thermostat device with the cover member of FIG. 2, and FIG. 4 is an enlarged cross-sectional view of part of the thermostat device in FIG. 3. FIG. 5 is a cross-sectional view on arrow B-B of the thermostat device with the cover member of FIG. 2. FIG. 6 is a cross-sectional view on arrow C-C of the thermostat device with the cover member of FIG. 1, and FIG. 7 is a cross-sectional view illustrating an enlarged part of FIG. 6.

As shown in FIG. 1, the thermostat device with the cover member 100 includes a thermostat device 10 and a cover member 1 attached to the thermostat device 10.

The thermostat device 10 is mounted, with the cover member 1 detached, on a cooling circuit of a power engine including, for example, an engine (internal combustion engine), a battery, and a stack for fuel cells and controls the temperature of the coolant. Meanwhile, the cover member 1 is temporarily attached to the thermostat device 10 in a step before the assembly of the thermostat device 10 to a counterpart member (such as a water pump, a water jacket of the power engine, members for attaching the thermostat device 10, or members constituting a cooling circuit) and is detached from the thermostat device 10 when the thermostat device 10 is assembled to the counterpart member.

Here, a thermostat device to which a cover member is attached is called "a thermostat device with a cover member," and a thermostat device from which the cover member is detached is simply called "a thermostat device."

First, the thermostat device 10 will be described. As described above, the thermostat device 10 is assembled to the counterpart member with the cover member 1 detached.

The thermostat device 10 is, as shown in FIG. 3, provided with a housing 2, a thermo-element 17 whose one end is supported by the housing 2 extending and retracting in response to the temperature, a valve body 15 that leaves from and is seated on a valve seat 20b, to be described later, in the housing 2 in response to the extending and retracting operation of the thermo-element 17, a coil spring 16 as a biasing member that biases the valve body 15 to the valve seat 20b side, a frame 19 supporting one end of the coil spring 16, and a guide member 26 hooked to the frame 19 guiding a temperature-sensitive case 30, to be described later, of the thermo-element 17.

For the convenience of the description below, the upper and lower portions of the thermostat device 10 shown in FIG. 3 are simply referred to as "the upper" and "the lower."

In the present embodiment, the housing 2 is provided with a vertexed cylindrical body 20 at whose lower edge (one end) an opening 20c is formed, a pair of flanges 3, 3 protruding outward from the lower-end outer periphery of the body 20, a pair of legs 21, 21 extending downward opposing to each other from the lower end opening edge of the body 20 (standing up opposing to each other from the lower end opening edge of the body 20), and a connecting port 23 of the radiator side extending obliquely upward from the top part of the body 20.

In the state where the thermostat device 10 has been assembled to the counterpart member, the coolant is configured to pass through the connecting port 23, the inside of the body 20, and the opening 20c; the flow passage 4 in the housing 2 is composed of those elements.

As shown in FIG. 2, one or two bolt holes 3a are provided each on the pair of flanges 3, 3. Metal cylinders are press-fitted into the bolt holes 3a, and bolts (not shown) for fastening the thermostat device 10 to the counterpart member are inserted in the cylinders. As shown in FIG. 3, an annular groove 20d is formed to surround the opening 20c, at the lower end opening edge of the body 20 located inside the bolt holes 3a (flange 3), and a gasket 25 is mounted in the groove 20d.

The gasket 25 seals between the thermostat device 10 and the counterpart member and prevents the coolant flowing in the housing 2 from leaking outside in a state where the thermostat device 10 is attached to the counterpart member. The inside of the housing 2 is defined by the inside (inner side) of the gasket 25 at the body 20.

An annular valve seat 20b is formed at the inner periphery of the lower end opening edge of the body 20 located inside the housing 2; the flow passage 4 is opened or closed by the valve body 15 being unseated from or seated on the valve seat 20b.

The thermo-element 17 is inserted into the inside of the housing 2. The thermo-element 17 is disposed such that the thermo-element 17 follows along the axial line of the axial part of the body 20. The thermo-element 17 is provided with a temperature-sensitive case 30 incorporating a temperature-sensitive material such as wax changing the volume thereof in response to the temperature and a piston 18, whose upper end is supported by the housing 2, entering and exiting from the temperature-sensitive case 30 in response to the volume change of the temperature-sensitive material.

When the temperature of the coolant surrounding the temperature-sensitive case 30 rises, the temperature-sensitive material thereinside expands, the piston 18 exits from the temperature-sensitive case 30, and the thermo-element 17 extends. In contrast, when the temperature of the coolant surrounding the temperature-sensitive case 30 drops, the temperature-sensitive material thereinside contracts, the piston 18 enters the temperature-sensitive case 30, and the thermo-element 17 retracts. Thus, the thermo-element 17 operates to extend or retract depending on the temperature.

The tip end of the piston 18 located at the upper end of the thermo-element 17 is fitted to a cylinder-shaped boss 20a formed inside at the top portion of the body 20. Thus, the upward motion of the piston 18 against the housing 2 is inhibited. Therefore, when the thermo-element 17 operates to extend or retract, the temperature-sensitive case 30 moves down or up without changing the position of the piston 18 against the housing 2.

The valve body 15 is fixed to the outer circumferential surface of the temperature-sensitive case 30. With this, the valve body 15 moves down or up with the temperature-sensitive case 30 associated with the extension or retraction of the thermo-element 17. When the thermo-element 17 extends and the valve body 15 moves downward, the communication of the flow passage 4 is allowed because the valve body 15 leaves from the valve seat 20b, and the coolant can pass through therebetween. In contrast, when the thermo-element 17 retracts and the valve body 15 moves upward to be seated on the valve seat 20b, the communication of the flow passage 4 is shut down. Thus, the valve body 15 opens and closes the flow passage 4 by being unseated from and seated on the valve seat 20b.

The upper end of the coil spring 16 is in contact with the backside of the valve body 15. The coil spring 16 is disposed so as to surround the thermo-element 17. The lower end of the coil spring 16 is supported by the frame 19.

The periphery of the frame 19 is hooked to the tip end of the pair of legs 21, 21 formed on the housing 2, and the frame 19 is inhibited from moving downward against the housing 2. A through-hole is formed at the center of the frame 19. A guide member 26, having a cylinder shape, is inserted into the through-hole, and the temperature-sensitive case 30 is inserted movably up and down inside the guide member 26. That is, the temperature-sensitive case 30 is movable up and down against the frame 19 while guided by the guide member 26.

The guide member 26 includes a guiding portion 26a having a cylinder shape inside which the temperature-sensitive case 30 is inserted and a brim 26b protruding toward the outer periphery from the top end of the guiding portion 26a. The brim 26b is hooked to the frame 19 and put between the frame 19 and the coil spring 16. With this, the guide member 26 is fixed to the frame 19. The guiding portion 26a is cylindrical and has openings at the top and bottom, and additionally, multiple lateral holes 26a1 penetrating the wall thickness are formed in the guiding portion 26a. Because of this, the coolant can freely move inward and outward through the guiding portion 26a.

The coil spring 16 is a compressive spring and is disposed between the valve body 15 and the frame 19 in a compressed state. Thus, the valve body 15 is biased upward (toward the valve seat 20b side) by the coil spring 16. With this configuration, when the temperature of the coolant around the thermo-element 17 rises and the thermo-element 17 extends, the valve body 15 moves downward resisting the biasing force due to the coil spring 16 and leaves from the valve seat 20b. Meanwhile, when the temperature of the coolant around the thermo-element 17 drops and the thermo-element 17 retracts, the valve body 15 moves upward by the biasing force due to the coil spring 16 and comes closer to the valve seat 20b.

Followingly, the cover member 1 according to the present embodiment will be described in detail. As described above, the cover member 1 is mounted to the thermostat device 10 in a step before the assembly of the thermostat device 10 to a counterpart member.

More specifically, the cover member 1 is temporarily mounted on the thermostat device 10 to constitute a thermostat device with the cover member 100 with the thermostat device 10, between the completion of the manufacturing process where the thermostat device 10 is manufactured as a part and the entering of the assembly process where the thermostat device 10 is attached to the counterpart member. The period between the manufacturing process and the assembly process includes a storing process where the thermostat device 10 is stored and a transportation process where the thermostat device 10 is moved and transported.

The cover member 1 is formed of polypropylene (PP), for example, is transparent (including semitransparency), and has an almost uniform thickness all over the whole. In the present embodiment, the cover member 1 includes a dish-shaped portion 11 and a cylindrical portion 12 continuous therewith integrally.

As shown in FIG. 3, the dish-shaped portion 11 has an insertion hole 11A at its center. The pair of legs 21, 21 is inserted in the insertion hole 11A in a state where the cover member 1 is mounted on the thermostat device 10. As shown in FIG. 2, the dish-shaped portion 11 is disposed to cover the gasket 25 in a state where the cover member 1 is mounted on the thermostat device 10.

In the present embodiment, the gasket 25 includes an annular sealing portion 25c disposed to surround the opening 20c of the housing 2 and multiple protrusions 25a, 25b protruding outward from the outer periphery of the sealing portion 25c. In the gasket 25, the sealing portion 25c substantially functions as a sealing member to seal between the housing 2 and the counterpart member, and the dish-shaped portion 11 is formed to cover the entire sealing portion 25c.

The protrusions 25a and 25b have a length set to go outside from the dish-shaped portion 11. In the present embodiment, the one protrusion 25a has a length set to protrude to the further outer periphery side from the housing 2. This enables the visual confirmation of the protrusion 25a easily due to the conspicuousness of the protrusion 25a, even in the case of the thermostat device with the cover member 100 where the cover member 1 is attached to the thermostat device 10.

The cylindrical portion 12 extends downward from an opening edge 11B of the insertion hole 11A at the center of the dish-shaped portion 11 (standing up from the opening edge 11B of the insertion hole 11A). As shown in FIG. 3, in the present embodiment, the cylindrical portion 12 is a bottomed cylinder, and the lower end is closed. Further, the pair of legs 21, 21, and the guide member 26 are inserted inside the cylindrical portion 12 in the state where the cover member 1 is mounted on the thermostat device 10.

The lower part of the cylindrical portion 12 has a small-diameter portion 12a whose inner and outer diameters are smaller than any other part thereof. The guiding portion 26a of the guide member 26 is inserted inside the reduce-diameter portion 12a. The inner diameter of the small-diameter portion 12a is greater than the outer diameter of the guiding portion 26a; the guiding portion 26a can be inserted inside the small-diameter portion 12a without resistance.

In the cylindrical portion 12, portions opposing to the pair of legs 21, 21 of the thermostat device 10 with the cover member 1 are corrugated sections 13. That is, a pair of corrugated sections 13, 13 are provided corresponding to the pair of legs 21, 21 in the cylindrical portion 12. Let portions connected to the pair of corrugated sections 13, 13 along the circumferential direction be intermediate portions 12b, respectively, as shown in FIGS. 1 and 2, and the pair of the corrugated sections 13, 13 are disposed at the outer side of the intermediate portions 12b (at the side leaving from the center of the cover member 1) and are elastically deformable.

The pair of the corrugated sections 13, 13 have a tightening margin against the pair of the legs 21, 21. With this, at the time when the cover member 1 is attached to the thermostat device 10, the pair of legs 21, 21 are inserted into the cylindrical portion 12 with elastically deforming the corrugated sections 13. Thus, the cover member 1 is supported by the thermostat device 10 since the pair of the legs 21, 21 are press-fitted between the corrugated sections 13, 13 of the cylinder portion 12.

As shown in FIG. 4, the corrugated section 13 has a form of mountain bending portions and valley bending portions which are alternately connected up and down, and the bending portions are curved, respectively.

As shown in FIGS. 5 through 7, in the inner circumferential surface of the cylindrical portion 12, inward-convex portions 14 are provided at the positions upper side than the frame 19, in the state where the cover member 1 is attached to the thermostat device 10. In the present embodiment, the inward-convex portions 14 four in number are provided in the circumferential direction lined up at the intermediate portions 12b. The surface shape of the inward-convex portions 14 is spherical. As described before, the thickness of the cover member 1 is almost uniform all over the whole. The portions corresponding to the inward-convex portions 14 of the cylindrical portion 12 are recessed viewed from the outside. Each inward-convex portion 14 is elastically deformable, similar to the corrugated section 13.

Further, when the cover member 1 is attached to the thermostat device 10, the frame 19 is to be moved downward the inward-convex portions 14 by climbing over the inward-convex portions 14. When the frame 19 is moved downward over the inward-convex portions 14, the inward-convex portions 14 are caused to elastically deform. After the frame 19 climbs over the inward-convex portions 14, the inward-convex portions 14 return to the shape before due to their elasticity.

As described above, the cover member 1 of the present embodiment is attached to the thermostat device 10 detachably and, together with the thermostat device 10, constitutes a thermostat device with the cover member 100. The thermostat device 10 includes a housing 2 being provided with a body 20 that has an opening 20c at one end and a groove 20d formed so as to surround the opening 20c and a pair of legs 21, 21 extending downward opposing to each other from the lower end opening edge of the body 20 (standing up opposing to each other from the lower end opening edge) inside the groove 20d, and a gasket 25 to be fitted in the groove 20d. The cover member 1 includes a dish-shaped portion 11 having insertion holes inside through which the pair of legs 21, 21 are inserted and covering the gasket 25 and a cylindrical portion 12 extending downward from the opening edge of the insertion hole at the center of the dish-shaped portion 11 (standing up from the opening edge of the insertion hole) inside of which the pair of legs 21, 21 are press-fitted. A corrugated section 13 is formed at the portion of the cylindrical portion 12 to which the legs 21 oppose.

With the above constitution, the gasket 25 is covered with the dish-shaped portion 11 in the state where the cover member 1 is attached to the thermostat device 10, that is, in the thermostat device with the cover member 100. The coming off of the gasket 25 due to the vibration during transportation, for example, can be surely prevented by attaching the cover member 1 to the thermostat device 10 to form the thermostat device with the cover member 100.

Since, with the above constitution, the cover member 1 is supported by the thermostat device 10 by press-fitting the legs 21 into the elastically deformable corrugated section 13, the cover member 1 is easily detachable to the thermostat device 10. Further, since providing the corrugated section 13 on the cover member 1 enables it to attach the cover member 1 to the thermostat device 10, the cover member 1 can be formed by an inexpensive method such as blow molding. Thus, the cover member 1 and the thermostat device with the cover member 100 can be inexpensive.

Furthermore, the forming method and the material of the cover member 1 are appropriately changeable.

In the embodiment of the cover member 1 and the thermostat device with the cover member 100, the lower end (one end) of the cylindrical portion 12 of the cover member 1 is closed. This allows the prevention of foreign matters such as dust from entering the cover member 1 and, after the thermostat device 10 is assembled to the counterpart member, allows the inhibition of foreign matters from mixing into the coolant. Moreover, the leakage of the coolant due to a bitten foreign matter between the valve body 15 and the valve seat 20b or between the gasket 25 and the counterpart member can be prevented.

This is particularly effective for the case where the leakage of the coolant needs to be surely inhibited, or the thermostat device 10 is exposed to an environment full of dust; however, an opening may be formed at the lower end (one end) or other portion of the cylindrical portion 12.

In the present embodiment, the thermostat device 10 includes a valve seat 20b formed inside the body 20, a thermo-element 17, the upper end (one end) of which is supported by the body 20, extending and retracting depending on the temperature, a valve body 15 unseated from or seated on the valve seat 2b in response to the extension-retraction operation of the thermo-element 17, a coil spring (a biasing member) 16 biasing the valve body 15 upward (to the valve seat 20b side), and a frame 19 being supported by the pair of legs 21, 21 to support the lower end (one end) of the coil spring 16. Furthermore, an inward-convex portion 14 protruding inward is formed on the cylindrical portion 12. The inward-convex portion 14 is located at the upper side (body 20 side) than the frame 19 in a state where the cover member 1 is attached to the thermostat device 10. When the cover member 1 is attached to or detached from the thermostat device 10, the inward-convex portion 14 elastically deforms due to the contact of the inward-convex portion 14 with the frame 19.

Since, according to the above constitution, the frame 19 interferes with the inward-convex portion 14 when the cover member 1 is detached from the thermostat device 10, the cover member 1 is prevented from unintentionally detaching from the thermostat device 10 due to the vibration during the transportation.

The cover member 1 is supported by the thermostat device 10 by hooking the inward-convex portion 14 to the frame 19, and in such a case, the corrugated section 13 may be eliminated, and the pair of legs 21, 21 may be inserted into the cylindrical portion 12. In this case, as well, the cover member 1 is easily attached to or detached from the thermostat device 10. Furthermore, since the cover member 1 is easily attached to the thermostat device 10 by forming the inward-convex portion 14 to the cover member 1, the cover member 1 can be formed by an inexpensive method such as blow molding. Thus, the cover member 1 and the thermostat device with the cover member 100 can be inexpensive.

The surface shape of the inward-convex portion 14 is spherical in the present embodiment. For this reason, even when the hooking margin of the inward-convex portion 14 and the frame 19 is made large for being hard to come off of the cover member 1 from the thermostat device 10, it is possible to inhibit the difficulty of attaching the cover member 1 to the thermostat device 10. That is, it is easy to ensure the hooking margin of the inward-convex portion 14 with the frame 19 and is hard to come off without degrading the mountability of the cover member 1.

In the present embodiment, the portion of the cylindrical portion 12 located outside of the inward-convex portion 14 is recessed. Since, with this constitution, the thickness of the inward-convex portion 14 can be the same as the other portion, the cover member 1 can be easily formed by blow molding. Moreover, since the inward-convex portion 14 can be easily elastically deformable, even when the hooking margin of the inward-convex portion 14 and the frame 19 is made large, it can inhibit the difficulty of attaching the cover member 1 to the thermostat device 10. With this constitution, it can also be hard to come off without degrading the mountability of the cover member 1.

The shape, wall thickness, number, and position of the inward-convex portion 14 can be appropriately changed. When the unintentional coming off of the cover member 1 from the thermostat device 10 can be sufficiently inhibited by such as setting the fastening margin of the corrugated section 13, the inward-convex portion 14 can be eliminated.

In the present embodiment, the protrusions 25a, 25b protruding outward of the dish-shaped portion 11 are formed on the gasket 25. With this constitution, the attachment of the gasket 25 can be easily visually confirmed even when the cover member 1 is attached to the thermostat device 10. This is particularly effective when the cover member 1 is opaque, or the gasket 25 is difficult to visually confirm the gasket 25 from the outside of the cover member 1 even when transparent. However, the protrusions 25a, 25b can be omitted if the gasket 25 is surely attached.

The protrusions 25a, 25b are used for the purpose of fitting an irregular-shaped (shaped other than true-circular) gasket 25 into the groove 20d with the correct orientation. In such a case, when the protrusion 25a protrudes outside the housing 2, the gasket 25 may come off by catching the protrusion 25a when handling the thermostat device 10. Then, since, if the cover member 1 is attached, the gasket 25 does not easily come off if catching the protrusion 25a, attaching the cover member 1 is particularly effective in the thermostat device 10 with the gasket 25 having the protrusion 25a.

The shape of the gasket 25 may be true-circular. Then, the protrusions 25a, 25b may have a length hidden by the dish-shaped portion 11 or omitted.

In the present embodiment, the bending portions of the mountain fold and the valley fold of the corrugated section 13 are respectively curved with a rounded profile. For this reason, even when the fastening margin of the corrugated section 13 to the legs 21 is made large to prevent the cover member 1 from coming off from the thermostat device 10, the difficulty in attaching the cover member 1 to the thermostat device 10 is inhibited. That is, even the above constitution allows the prevention of coming off of the cover member 1 without deteriorating the mountability thereof.

The number, shape, and convolution pitch of the bending portions of the mountain fold and the valley fold of the corrugated section 13 may be appropriately changed.

In the present embodiment, the legs 21 are press-fitted into the cylindrical portion 12, and any other portions except the legs 21 of the thermostat device 10 do not interfere with the cover member 1. Because of this, the cover member 1 can be easily attached to or detached from the thermostat device 10.

In contrast, for example, in the cover member 1, a small diameter portion 12a may be provided with a corrugated section 13 and a guide portion 26a of the guide member 26 may be press-fitted thereinside.

In this way, portions of the thermostat device 10 other than the legs 21 may be press-fitted into the cover member 1.

Preferred embodiments of the invention have been described in detail; modifications, variations, and alterations are possible as long as they do not depart from the scope of the claims.

INDUSTRIAL APPLICABILITY

As described above, the cover member according to the present invention is useful as a temporarily attached cover member to the thermostat device and is particularly suitable for the cover member attached during the transportation of the thermostat device in the term from the manufacturing of a thermostat device as a part to the assembly to a counterpart member.

REFERENCE SIGNS LIST 1 cover member
2 housing
3 flange
3a bolt hole
4 flow passage
10 thermostat device
11 dish-shaped portion
12 cylindrical portion
12a small-diameter portion
12b intermediate portion
13 corrugated section
14 inward-convex portion
15 valve body
16 coil spring (biasing member)
17 thermo-element
18 piston
19 frame
20 body
20a boss
20b valve seat
20c opening
20d groove
21 leg
23 connecting portion
25 gasket
25a protrusion
25b protrusion
25c sealing portion
26 guide member
26a guiding portion
26b brim
26a1 lateral hole
30 temperature-sensitive case
100 thermostat device with a cover member

The invention claimed is:
1. A cover member detachably attached to a thermostat device which is provided with a housing that includes a body having an opening at one end where a groove is formed to surround the opening, and a pair of legs standing up opposingly from one end of the body inside the groove, and with a gasket to be fitted into the groove, comprising:
a dish-shaped portion covering the gasket having insertion holes inside in which the pair of legs are inserted; and
a cylindrical portion standing up from the opening edge of the insertion holes, inside of which the pair of legs are press-fitted,
wherein a corrugated section is formed at a portion opposing to each one of the legs of the cylindrical portion,
wherein the thermostat device includes
a valve seat formed inside the body,
a thermo-element, one end of which is supported by the body, extending and retracting depending on the temperature,
a valve body unseated from or seated on the valve seat in response to the extension-retraction operation of the thermo-element,
a biasing member biasing the valve body to the valve seat side, and
a frame being supported by the pair of legs and supporting one end of the biasing member, and
wherein
an inward-convex portion protruding inward is formed in the cylindrical portion,
the inward-convex portion is located on the body side from the frame in a state where the cover member is attached to the thermostat device, and
the inward-convex portion comes into contact with the frame to deform elastically when the cover member is attached to or detached from the thermostat device.
2. The cover member in claim 1,
wherein the surface shape of the inward-convex portion is spherical.
3. The cover member of claim 2,
wherein
portions of the cylindrical portion located at the outside of the inward-convex portion are recessed.
4. A cover member that is detachably attached to a thermostat device, which includes
a housing provided with a body that has an opening at one end and a groove formed so as to surround the opening and a pair of legs standing up opposing to each other at the one end of the body inside the groove,
a gasket to be fitted in the groove,
a valve seat formed inside the body,
a thermo-element, one end of which is supported by the body, extending and retracting depending on the temperature,
a valve body unseated from or seated on the valve seat in response to the extension-retraction operation of the thermo-element,
a biasing member biasing the valve body to the valve seat side, and
a frame being supported by the pair of legs and supporting one end of the biasing member,
wherein
the cover member includes a dish-shaped portion that has insertion holes inside, through which the pair of legs are to be inserted, and covers the gasket,
and a cylindrical portion standing up from the opening edge of the insertion holes and to which the pair of legs is to be inserted thereinside, and
wherein
an inward-convex portion protruding inward is formed in the cylindrical portion,
the inward-convex portion is located on the body side from the frame in a state where the cover is attached to the thermostat device, and the inward-convex portion comes into contact with the frame to deform elastically when the cover member is attached to or detached from the thermostat device.

5. The cover member in claim 4,
wherein one end of the cylindrical portion is closed.

6. The cover member in claim 4,
wherein the surface shape of the inward-convex portion is spherical.

7. The cover member of claim 6,
wherein
portions of the cylindrical portion located at the outside of the inward-convex portion are recessed.

8. The cover member in claim 4,
wherein
the gasket is formed with a protrusion protruding outside of the dish-shaped portion.

9. A thermostat device equipped with a cover member, wherein the thermostat device and the cover member are detachably attached to each other,
wherein
the thermostat device comprises a housing that includes a body having an opening on one end and a groove formed so as to surround the opening and a pair of legs standing up opposing to each other from the one end of the body inside the groove, and a gasket to be fitted in the groove;
the cover member is provided with a dish-shaped portion having insertion holes there inside through which the pair of legs are to be inserted, and capped on the gasket; and a cylindrical portion standing up from the opening edge of the insertion holes and inside of which the pair of legs is to be press-fitted; and a corrugated section is formed at a portion opposing to the legs of the cylindrical portion,
wherein the thermostat device includes
a valve seat formed inside of the body,
a thermo-element whose one end is supported by the body extends and retracts depending on the temperature,
a valve body that is unseated from or seated on the valve seat in response to the extension-retraction operation of the thermo-element,
a biasing member that biases the valve body to the valve seat side, and
a frame supported by the pair of legs supporting one end of the biasing member;
and
wherein
an inward-convex portion protruding inward is formed inside the cylindrical portion of the cover member; the inward-convex portion is located at the body side inner than the frame in a state where the cover is attached to the thermostat device, and when the cover member is attached to or detached from the thermostat device, the inward-convex portion comes into contact with the frame to deform elastically.

\* \* \* \* \*